United States Patent [19]

Meador

[11] Patent Number: 4,514,693

[45] Date of Patent: Apr. 30, 1985

[54] DIELECTRIC WELL LOGGING SYSTEM WITH ELECTROSTATICALLY SHIELDED COILS

[75] Inventor: Richard A. Meador, Houston, Tex.

[73] Assignee: Texaco Inc., White Plains, N.Y.

[21] Appl. No.: 85,613

[22] Filed: Oct. 17, 1979

Related U.S. Application Data

[63] Continuation of Ser. No. 864,351, Dec. 27, 1977, abandoned.

[51] Int. Cl.³ .......................... G01V 3/28; H01F 15/04
[52] U.S. Cl. ..................:......................... 324/338; 324/341;
                                                          336/84 C
[58] Field of Search ...................... 336/83, 84 R, 84 C;
                                               324/338, 341

[56] References Cited

U.S. PATENT DOCUMENTS

| | | | |
|---|---|---|---|
| 1,548,022 | 8/1925 | Casper et al. | 336/84 C |
| 1,624,473 | 4/1927 | Clement | 336/84 C X |
| 2,170,048 | 8/1939 | Dunning et al. | 336/84 C X |
| 2,914,719 | 11/1959 | Walton et al. | 336/84 C X |
| 2,948,871 | 8/1960 | Craige | 336/83 |
| 2,949,591 | 8/1960 | Craige | 336/83 |
| 3,244,960 | 4/1966 | Stevens et al. | 336/84 C X |
| 3,358,256 | 12/1967 | Naito et al. | 336/83 |
| 3,717,833 | 2/1973 | Kubota et al. | 336/84 C X |

Primary Examiner—Thomas J. Kozma
Attorney, Agent, or Firm—Jack H. Park; Carl G. Ries

[57] ABSTRACT

Transmitting and receiving coils for radio frequency (RF) dielectric well logging are shielded in copper enclosures to substantially remove unwanted electrostatic or capacitive signals introduced by the conductive fluids in the well bore.

3 Claims, 7 Drawing Figures

DIELECTRIC WELL LOGGING SYSTEM WITH ELECTROSTATICALLY SHIELDED COILS

This is a continuation of application Ser. No. 864,351, filed Dec. 27, 1977, now abandoned.

BACKGROUND OF THE INVENTION

1. Field of Invention

The present invention relates to dielectric well logging techniques.

2. Description of Prior Art

In dielectric well logging operations, a magnetic field was generated in a transmitter coil, which was lowered in the well, to cause conduction and displacement current flow in a formation surrounding a well bore. The displacement current flow induced a voltage in a receiver coil spaced from the transmitter.

However, due to the presence of fluids such as drilling mud, the well bore was somewhat conductive, causing a signal coupling path through the mud column in the well bore. The unwanted signal travelling along this path was the result of an electric field effect and was often called an electrostatic or capacitive signal. U.S. Pat. No. 3,094,658 describes structure directed to an effort to remove the effect of this unwanted capacitive signal during induction well logging at frequencies, such as at approximately 20 kilohertz. U.S. Pat. No. 3,893,021, of which Applicant is a co-inventor, discloses another dielectric well logging system in which electrostatic shields of this general type are used.

However, when the frequency of the system was raised into the radio frequency spectrum, problems with prior art shielding arose. Logs obtained in the same formation differed when different size outside cases were used for the logging system.

SUMMARY OF INVENTION

Briefly, the present invention provides new and improved electrostatic shielding for transmitter and receiver coils of a dielectric well logging system. A toroidal metallic tube of the transmitter shield substantially encloses a plurality of turns of wire which form the transmitter coil. The metallic toroid has a gap extending radially therethrough to reduce eddy current flow in the transmitter shield. A conduit extends from the toroid to enclose and shield a conductor which electrically connects the transmitter coil to other electronic circuitry portions of the well logging system.

The receiver shield includes a cylindrical metal tube member enclosing a cylindrically wound receiver coil. The cylindrical member includes a gap formed along the length to prevent eddy current flow. End closure plates are mounted at each end of the tube member for substantially enclosing the receiver coil within the shield. The end closure plates have slots formed therein extending radially outwardly from a center portion thereof, and connecting with the gap formed in the tube member, to reduce eddy current flow.

DESCRIPTION OF THE PREFERRED EMBODIMENT

Figure 1:
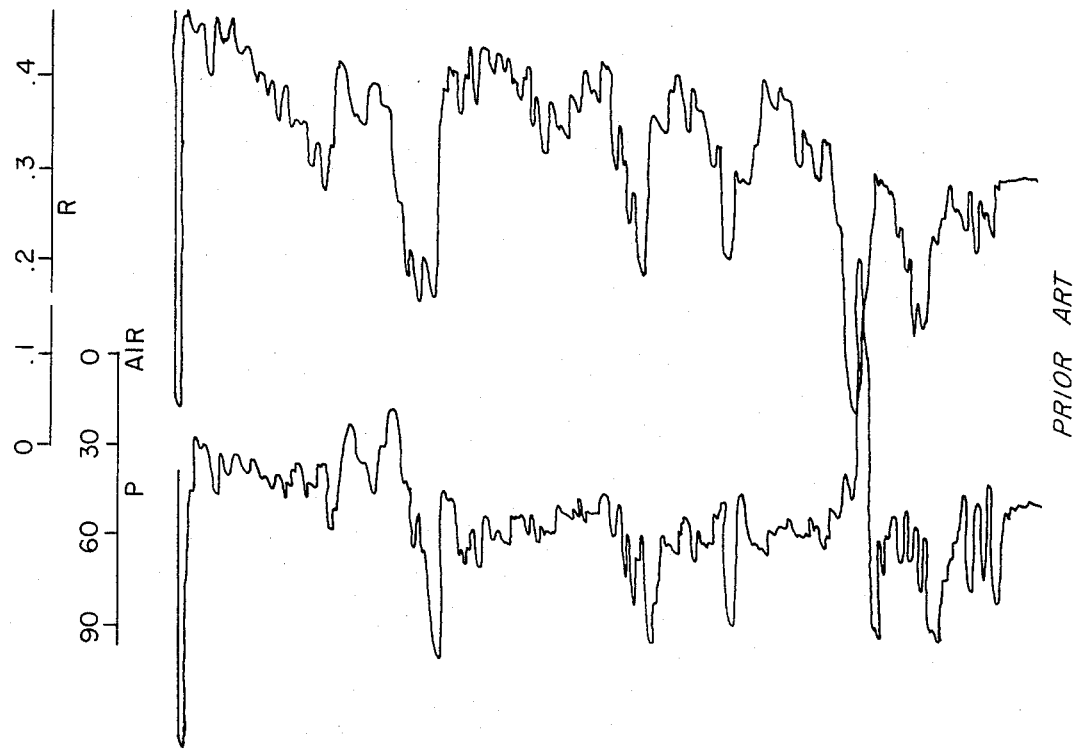
FIGS. 1 and 2 are dielectric well logs obtained using prior art apparatus.
Figure 2:
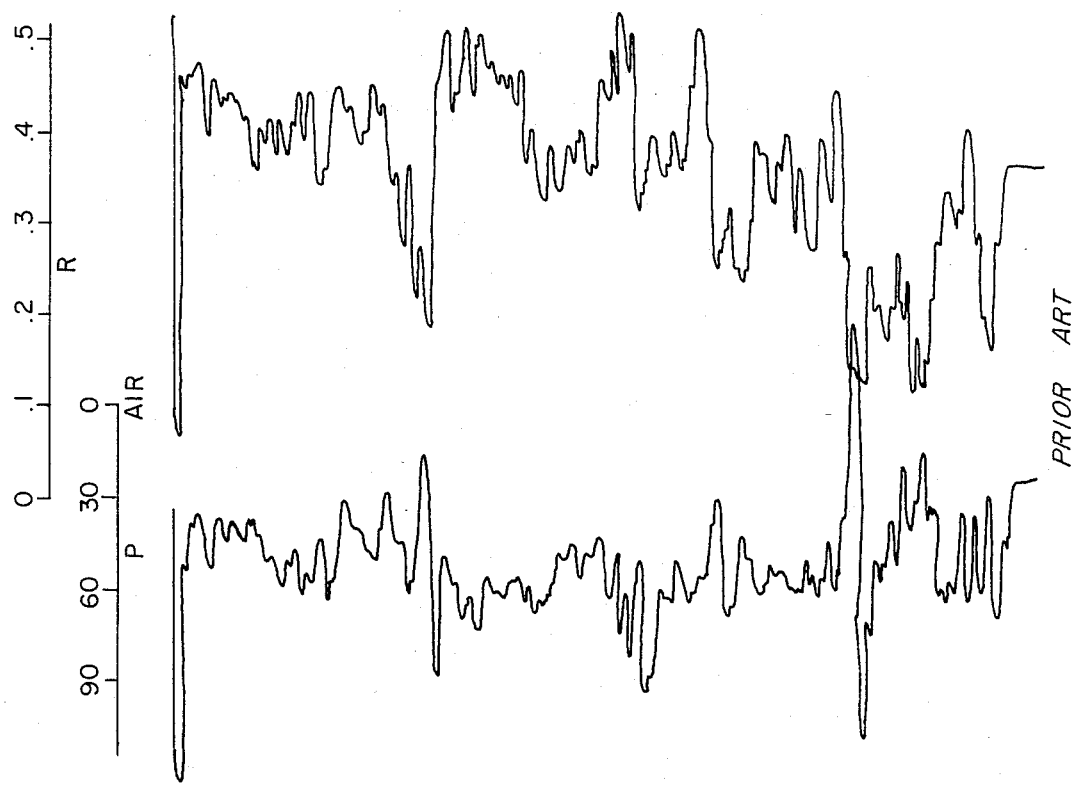

At the outset, it is beneficial to consider results obtained from the use of conventional prior art electrostatic shields for dielectric well logs at radio frequencies. FIG. 1 represents a portion of a dielectric well log obtained with a prior art dielectric well log system in a formation, with the downhole portions of the system mounted in a four and one-eighth inch outside diameter ($4\frac{1}{8}''$ O.D.) case. FIG. 2 represents a portion of a dielectric well log obtained in the same formation as the log of FIG. 1 but having the downhole portions of the well logging system mounted in a three and one-eighth inch outside diameter ($3\frac{1}{8}''$ O.D.) case. As is evident from a comparison of the two logs from the same formation, significant differences, which are substantially entirely due to electrostatic effects, and which are of importance to an analyst, exist between the two logs from the same formation.

Figure 6:
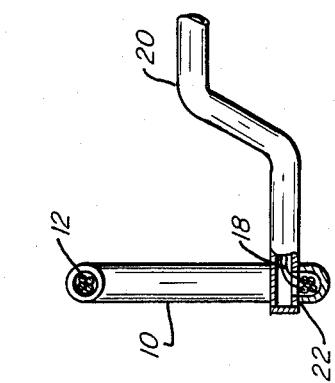
FIG. 6 is a cross-sectional view taken along the line 6—6 of FIG. 5.
Figure 4:
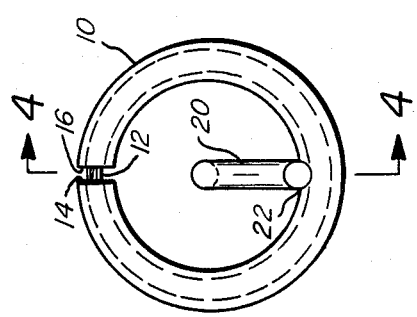
FIG. 4 is a cross-sectional view taken along the line 4—4 of FIG. 3.
Figure 5:
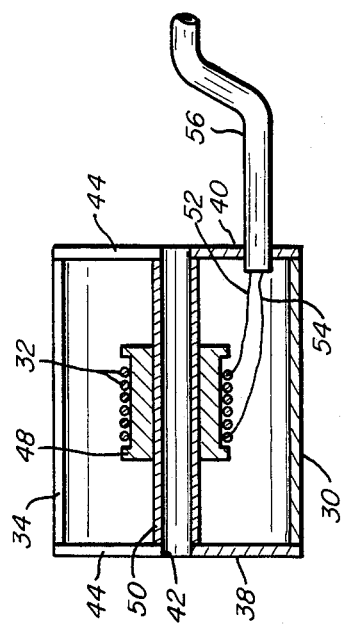
FIG. 5 is an elevation view of a receiver coil shield of the present invention.
Figure 3:
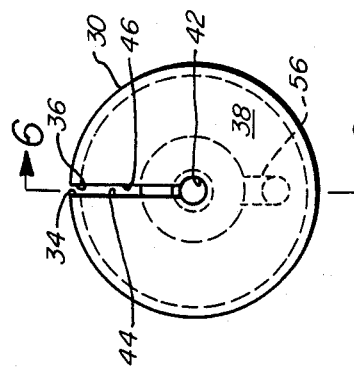
FIG. 3 is an elevation view of a transmitter coil shield of the present invention.

Referring now to the present invention, a transmitter shield T (FIGS. 3 and 4) and a receiver shield R (FIGS. 5 and 6) for shielding a transmitter and a receiver, respectively in a dielectric well logging system are set forth in the drawings. Since the remaining portions of the dielectric well logging system are conventional, they are not shown in the drawings.

Considering the transmitter shield T, a toroidal tube 10 of copper or other suitable metal encloses a transmitter coil 12 of the dielectric well logging system. The coil 12 is formed from a suitable number of closely mounted turns of insulated wire.

Tube 10 has a gap formed therein between surfaces 14 and 16 and extending radially therethrough. The gap so formed in the tube 10 is for the purposes of reducing eddy current flow in the toroidal tube 10. The electrical wire of the transmitter coil 12 is electrically connected by a conductor 18 to known transmitter electronic circuitry in the downhole portion of the dielectric well logging system. Such circuitry is set forth, by way of example, in U.S. Pat. Nos. 3,893,021 and 3,993,944, each of which is assigned to the assignee of the present invention. The conductors 18 are enclosed within and shielded by a conduit or tube 20 formed from copper or other suitable material. The conduit 20 is mounted in connection with the tube 10 at an elbow or corner 22 to permit electrical connection between the conductor 18 and the wire of the transmitter coil 12. It is to be noted that the coil 12 is substantially entirely enclosed within, and in close proximity to, the transmitter shield T.

The receiver shield R (FIGS. 5 and 6) is in the form of a hollow cylinder or tube 30 of copper or other suitable material. A cylindrical receiver coil 32 in the form of a plurality of closely spaced turns of insulated wire is contained within and shielded by the receiver shield R. The tube 30 has a gap formed therein between surfaces 34 and 36 along the length in order to reduce eddy current flow within the tube 30. Circular end closure plates 38 and 40 are mounted at opposite ends of the tube 30 to complete the enclosure of the receiver coil 32 within the receiver shield R. The end closure plates 38 and 40 have slots formed therein extending radially outward from an enlarged center opening adjacent a surface 42 between surfaces 44 and 46 to an outer edge where juncture is made with the gap formed in the tube 30. The center opening in the end plate members 38 and 40 is enlarged with respect to the slot formed therein. The slits in the enclosure plates 38 and 40 and the gap in the tube 30 accordingly form a gap or opening for preventing eddy current flow, with such opening extending from the center of each of the two end plates 38 and 40 along one side of the tube 30. Other than this relatively small gap, it is to be noted that receiver coil 32 is substantially completely enclosed in the receiver shield R.

The receiver coil 32 is preferably mounted on a cylindrical spool 48 in the center of the tube 30. Spool 48 is mounted on a rod 50 mounted to extend between the end plates 38 and 40. Electrical wires 52 and 54 electrically connect to receiver coil 32 to receiver electronic circuitry of the dielectric well log system. Such circuitry is set forth, by way of example, in U.S. Pat. Nos. 3,893,021 and 3,993,944, each assigned to the assignee of the present application. The conductors or electrical wires 52 and 54 are contained within and shielded by an elongated hollow metal conduit or tube 56 extending through an opening formed within the end plate 40 so that the conduit 56 may be mounted with the receiver shield R.

Figure 7:
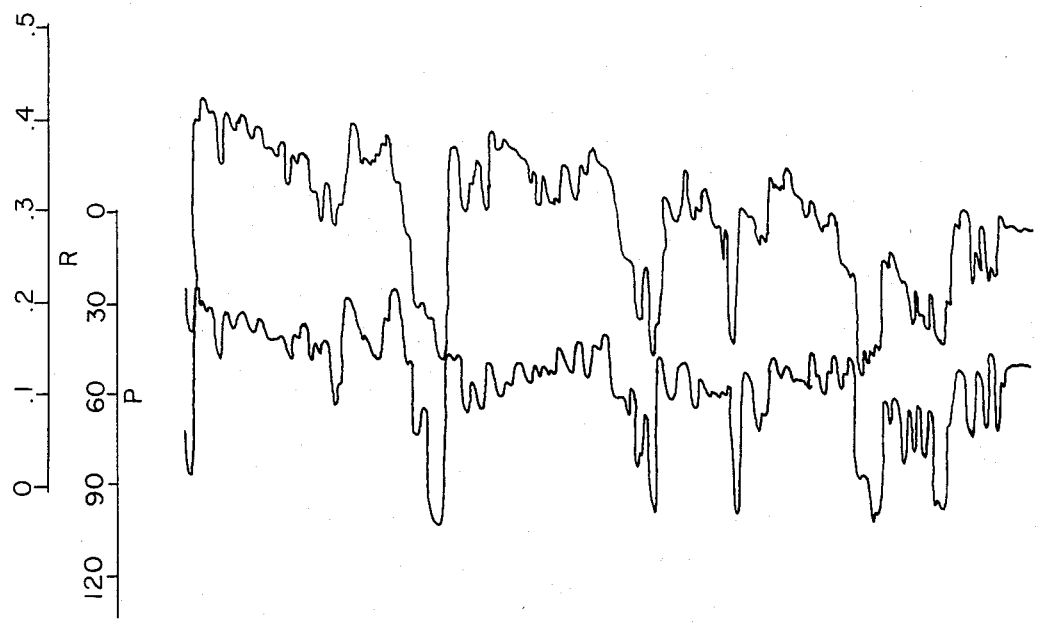
FIG. 7 is a dielectric well log obtained using the electrostatic shields of the present invention in a dielectric well logging system.

With the present invention, a new dielectric logging test run was performed in the formation where logs were obtained, whose results are displayed in FIGS. 1 and 2, using however the transmitter shield T and receiver shield R of the present invention during the new log. The result is illustrated graphically in FIG. 7 for one size of outer casing. The results for the other size outer casing were substantially identical to those in FIG. 7.

It is to be noted that, except for eddy current reducing gaps and slots, both the transmitter shield T and the receiver shield R substantially completely enclose the coils 12 and 32, respectively. Further, the shields T and R are mounted in close proximity to the coils 12 and 32, respectively. By completely enclosing the transmitter coil 12 and receiver coil 32 in shields T and R, respectively, of the present invention and bringing such coils into close proximity to the shields, substantial and unexpected improvements in dielectric well logging results are obtained.

It is to be noted that the size of the tube 30 and the receiver coil 32 therewithin are determined by the maximum acceptable capacitance from shield to coil at a given frequency of dielectric well logging operations. A simplified form for the general formula for capacitance from coil 32 to shield 30 is given by:

$$C = \frac{2\pi\epsilon L}{\ln(r_s/r_c)}$$

where $\epsilon$ is the dielectric constant of the material between the coil and the shield;

L is the length of the coil;

$r_s$ is the radius of the shield; and $r_c$ is the radius of the coil.

By way of example, for dielectric well logging operations at the ratio frequency of thirty megahertz (30 MHz), dimensions which have been found to be satisfactory are 13/16" radius for the shield 30 and 5/16" radius for the coil 32. With air serving as a dielectric medium between the shield 30 and the coil 32 and a coil one-half inch (½") long, a coil-to-shield capacitance of only approximately 0.4 picofarads was observed.

An additional modification which may be made, according to the present invention, if desired, is effected by removing the hollow rod 50 which serves as a shield and by mounting the spool member 48 to an inner wall of the tube 30 using suitable mounting arms.

Another additional modification which may be made, if desired, is that the transmitter coil may be shielded in a shield of like configuration to the receiver shield R. Also, if desired, both the transmitter coil 12 and receiver coil 32 may be tapped resonant circuits rather than impedance matched circuits.

The foregoing disclosure and description of the invention are illustrative and exemplary thereof, and various changes in the size, shape and materials as well as in the details of the illustrated construction may be made within the scope of the appended claims without departing from the spirit of the invention.

I claim:

1. An electrostatically shielded receiver coil system for a dielectric well logging system, comprising:
    (a) a cylindrical metallic shield member;
    (b) a radio frequency dielectric well logging receiver comprising a cylindrically wound wire coil wound on a spool member;
    (c) said cylindrical metallic shield member having a gap formed along its length for reducing eddy current flow therein;
    (d) end metallic shield closure plate members mounted at opposite ends of said cylindrical shield member for closing the ends of same and enclosing said coil in said cylindrical shield member;
    (e) a tubular support rod mounted extending between said end shield members;
    (f) said support rod having said spool member mounted thereon;
    (g) said support rod further serving as a shield for said coil; and
    (h) each of said end metallic shield closure plate members having a slot formed therein extending radially outwardly from a center portion thereof to an outer edge thereof, said slots being formed in alignment with said gap in said cylindrical member.

2. The structure of claim 1, wherein said support rod is hollow and each of said end closure plates has an enlarged opening larger in diameter than said slot formed at a center portion thereof adjacent said support rod.

3. The structure of claim 1, further including:
    a conduit mounted in one of said closure plate members for enclosing a conductor connecting the receiver coil to other portions of the logging system.

* * * * *